United States Patent [19]

Yoshida

[11] Patent Number: 5,754,245

[45] Date of Patent: May 19, 1998

[54] CONVERSION FOR NON-INTERLACED SCANNING

[75] Inventor: Kozo Yoshida, Sagamihara City, Japan

[73] Assignee: U.S. Philips Corporation, New York, N.Y.

[21] Appl. No.: 700,701

[22] Filed: Jul. 10, 1996

[30] Foreign Application Priority Data

Jul. 13, 1995 [JP] Japan ................... 7-200582

[51] Int. Cl.$^6$ ........................................ H04N 7/01
[52] U.S. Cl. .................. 348/451; 348/450; 348/451
[58] Field of Search ................. 348/450–453, 348/448, 663, 665, 668, 667, 669, 670

[56] References Cited

U.S. PATENT DOCUMENTS

| | | |
|---|---|---|
| 4,626,891 | 12/1986 | Achiha . |
| 4,672,867 | 6/1987 | Pritchard ................... 348/451 |
| 4,882,765 | 11/1989 | Katsumoto et al. ................... 348/451 |
| 4,967,271 | 10/1990 | Campbell et al. ................... 348/450 |
| 5,021,870 | 6/1991 | Motoe et al. . |
| 5,029,006 | 7/1991 | Katsumoto et al. ................... 348/451 |
| 5,428,398 | 6/1995 | Faronja ................... 348/452 |

*Primary Examiner*—Victor R. Kostak
*Attorney, Agent, or Firm*—Edward W. Goodman

[57] ABSTRACT

In order to reduce the number of field memories for a converting apparatus for non-interlaced scanning three field memories 53 to 55, a Y/C separator and a motion detector are arranged on the converting apparatus. Based on a luminance signal and a color signal which are generated by the Y/C separator, three luminance signals and color differential signals are generated for a sample (base) line and a complemented line. The three luminance signals and color differential signals are selected based on a detected result of the motion detector. When the selection is carried out, the luminance signal and the color difference signal for a motion pixel are set to the luminance signal and the color difference signal which are generated based on the newest image signal.

3 Claims, 3 Drawing Sheets

CONVERSION FOR NON-INTERLACED SCANNING

BACKGROUND OF THE INVENTION

1. Field of the Invention

The present invention relates to a conversion method and apparatus for non-interlaced scanning which generates a color difference signal and a luminance signal of a non-interlaced scanning system by performing a Y/C separation of an image signal (composite signal) of an interlaced scanning system, and detecting motion of an image represented by the image signal.

There are an interlaced scanning system and a non-interlaced scanning system as a television scanning system. An image displayed by an interlaced scanning system has an advantage that it has less flicker than an image displayed by a non-interlaced scanning system. Conversion of an image signal of an interlaced scanning system to an image signal of a non-interlaced scanning system, or more concretely, conversion of it into a luminance signal and a color difference signal is attained by a converting apparatus for non-interlaced scanning.

2. Description of the Related Art

An existing converting apparatus for non-interlaced scanning needs at least five field memories. Since a field memory is expensive in general, it has been difficult to implement a low-price converting apparatus for non-interlaced scanning in addition in order to attain also miniaturization of a converting apparatus for non-interlaced scanning, it has been desired to reduce the number of field memories to be mounted.

SUMMARY OF THE INVENTION

The present invention has been made in consideration of the above-mentioned problems, and an object of the invention is to provide a conversion method and apparatus for non-interlaced scanning which makes it possible to obtain signals, namely, a color difference signal and a luminance signal, of a non-interlaced scanning system on the basis of image signals of an interlaced scanning system by performing a Y/C separation and detecting motion in such a manner that the number of mounted field memories is limited to three. To this end, a first aspect of the invention provides a converting apparatus for non-interlaced scanning by performing a Y/C separation of an image signal of interlaced scanning, and a motion detection of an image which is represented by said image signal for generating a color difference signal and a luminance signal of the non-interlaced scanning for said image signal, characterized in that the converting apparatus comprises a first Y/C separator for generating a first luminance signal and a first color signal based on a newest image signal; a field memory having a capacity for storing image signals for three fields; a second Y/C separator for generating a second luminance signal and a second color signal based on the newest image signal and the image signal in the field memory which was generated two fields before said newest image signal; a third Y/C separator for generating a third luminance signal and a third color signal based on the image signals in the field memory which were generated one field and two fields before the newest image signal, respectively; a motion detector for detecting motion occurring in the image represented by the newest image signal and/or the image signals stored in the memory; and a scanning type converting part for generating the color difference signal and the luminance signal of the non-interlaced scanning by using the first to third color signals and the first to third luminance signals in accordance with a detected result of the motion detector. A second aspect of the invention provides a conversion method for non-interlaced scanning by performing a Y/C separation of an image signal of interlaced scanning and a motion detection of an image which is represented by said image signal for generating a color difference signal and a luminance signal of the non-interlaced scanning for said image signal, characterized in that the conversion method comprises the steps of generating a first luminance signal and a first color signal based on a newest image signal; storing image signals for three fields; generating a second luminance signal and a second color signal based on the newest image signal and a stored image signal generated two fields before said newest image signal; generating a third luminance signal and a third color signal based on stored image signals generated one field and two fields before the newest image signal, respectively; detecting motion occurring in the image represented by the newest image signal and/or the stored image signals; and generating the color difference signal and the luminance signal of the non-interlaced scanning by using the first to third color signals and the first to third luminance signals in accordance with a detected motion. An advantageous embodiment of an apparatus for converting for interlaced scanning by performing a Y/C separation of an image signal of an interlaced scanning system, and a motion detection of an image which is represented by said image signal for generating a color difference signal and a luminance signal of the interlaced scanning in accordance with the image signal, is characterized in that the converting apparatus comprises a first Y/C separator for generating a first luminance signal and a first color signal based on a newest image signal; a field memory having a memory capacity for storing image signals for three fields; a second Y/C separator for generating a second luminance signal and a second color signal based on the newest image signal and the stored image signal two fields prior to said newest image signal; a third Y/C separator for generating a third luminance signal and a third color signal based on the stored image signals delayed about one field and three fields, respectively; a motion detector for setting a first detecting signal to a valid situation when motion occurs in the image represented by the second color signal, and for setting a second detecting signal to a valid situation when motion occurs in the image represented by the third color signal; a first switch for selecting the first color signal when the first detecting signal is set to the valid situation, and for selecting the second color signal when the first detecting signal is set to an invalid situation; a second switch for selecting the first luminance signal when the first detecting signal is set to the valid situation, and for selecting the second luminance signal when the first detecting signal is set to an invalid situation; a third switch for selecting the first color signal when the second detecting signal is set to the valid situation, and for selecting an output of the first switch when the second detecting signal is set to the invalid situation; a fourth switch for selecting the first luminance signal when the second detecting signal is set to the valid situation, and for selecting an output of the first switch when the second detecting signal is set to the invalid situation; fifth and sixth switches for selecting the color difference signal which is generated by an output of the third switch when the color difference signal and the luminance signal based on the image signal of the odd field is output, and for outputting the color difference signal and the luminance signal based on the third color signal when the color signal and the luminance signal based on the image signal of the odd field and the second detecting signal is set to the invalid situation; and a seventh switch for selecting the luminance signal which is output from the fourth switch when the fifth and the sixth switches are selected the third switch, and for selecting the third luminance signal when the fifth and sixth switch are selected to the third color signal.

An embodiment of the invention is characterized by comprising a first Y/C separator for generating a first luminance signal and a first color signal based on the newest image signal, a field memory having a capacity for memorizing the image signals for three fields, a second Y/C separator for generating a second luminance signal and a second color signal based on the newest image signal and the image signal in the field memory which is generated at two fields before than said newest image signal, a third Y/C separator for generating a third luminance signal and a third color signal based on the image signals in the field memory which are generated at one field and two field before than the newest image signal, respectively, a motion detector for detecting a motion of the image which represented by the newest image signal and/or the image signals which are memorized in the memory, and a scanning type converting part for generating the color difference signal and the luminance signal of the non-interlaced scanning by using the first to third color signals and the first to third luminance signals in accordance with a detected result of the motion detector.

These and other aspects of the invention will be apparent from and elucidated with reference to the embodiments described hereinafter.

DESCRIPTION OF THE PREFERRED EMBODIMENT

Figure 1:
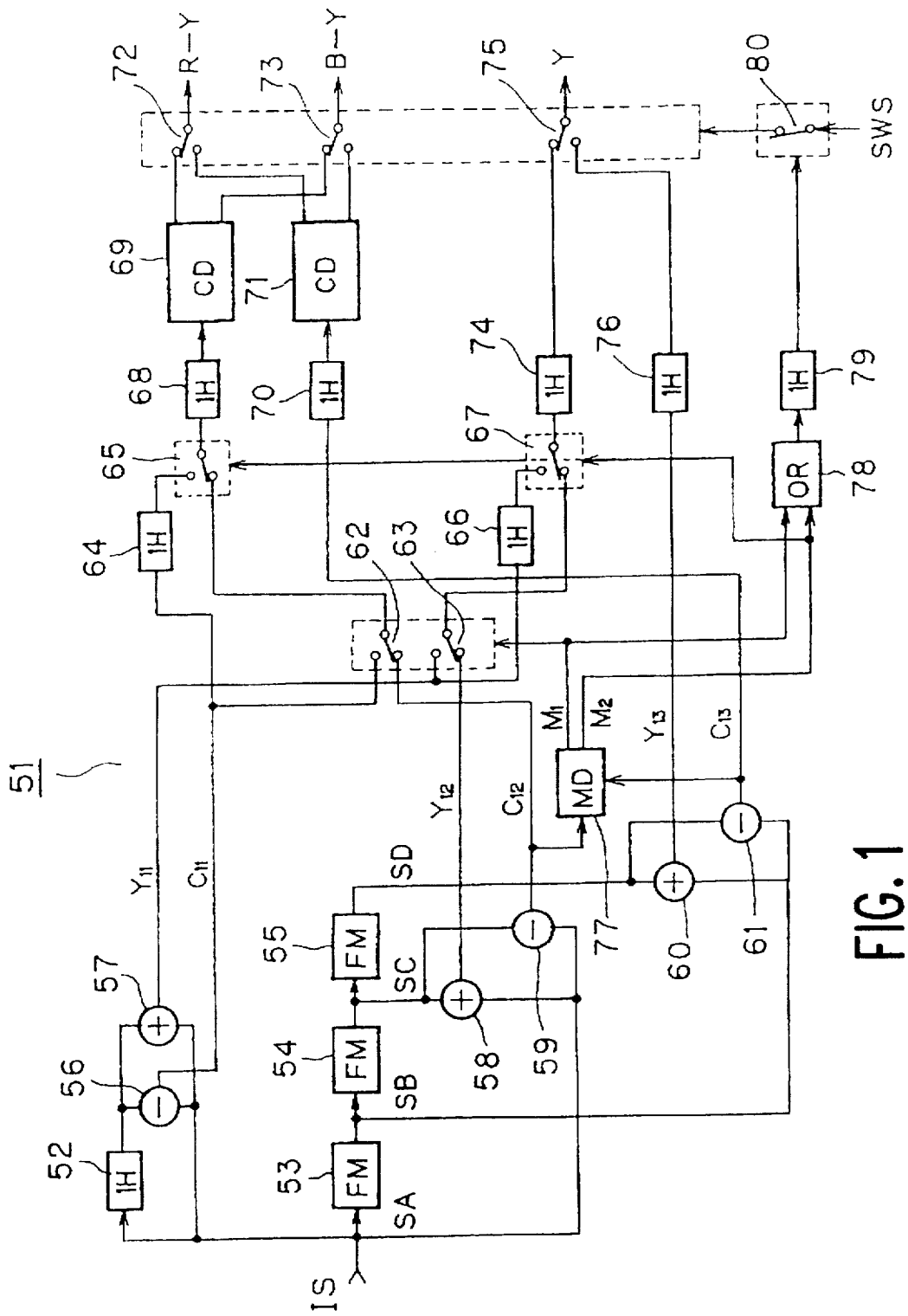
FIG. 1 is a block diagram of a converting apparatus for non-interlaced scanning of the invention.

FIG. 1 is a block diagram of a converting apparatus for non-interlaced scanning according to the present invention. In the converting apparatus for non-interlaced scanning 51 shown in the figure, an input image signal (composite signal) IS is supplied to a first line delay circuit 52 and a first field memory 53. Second and third field memories (FM) 54 and 55 are connected in series with this first field memory (FM) 53. An output of the first line delay circuit 52 is connected with one input side of a first subtracter 56 and one input side of a first adder 57. The image signal IS is supplied to the other input side of the first subtracter 56 and the other input side of the first adder 57. An output of the second field memory 54 is connected with one input side of a second adder 58 and one input side of a second subtracter 59. The image signal IS is supplied to the other input side of the second adder 58 and the other input side of the second subtracter 59. An output of the third field memory 55 is connected with one input side of a third adder 60 and one input side of a third subtracter 61. An output of the first field memory 53 is connected with the other input side of the third adder 60 and the other input side of the third subtracter 61. A first color signal C11 outputted from the first subtracter 56 is supplied to one input side of a first switch 62. Similarly, a first luminance signal Y11 outputted from the first adder 57 is supplied to one input side of a second switch 63. A second color signal C12 outputted from the second subtracter 59 is supplied to the other input side of the first switch 62. Similarly, a second luminance signal Y12 outputted from the second adder 58 is supplied to the other input side of the second switch 63. The first color signal C11 is also supplied to one input side of a third switch 65 through a second line delay circuit 64. An output of the first switch 62 is connected with the other input side of the third switch 65. The first luminance signal Y11 is also supplied to one input side of a fourth switch 67 through a third line delay circuit 66. An output of the second switch 63 is connected with the other input side of the fourth switch 67. An output of the third switch 65 is connected with a first color decoder (CD) 69 through a fourth line delay circuit 68. Similarly, an output of the third subtracter 61 is connected with a second color decoder (CD) 71 through a fifth line delay circuit 70.

A first color difference signal (R-Y) outputted from the first color decoder 69 is supplied to one input side of a fifth switch 72. A second color difference signal (B-Y) outputted from the first color decoder 69 is supplied to one input side of a sixth switch 73. A third color difference signal (R-Y) outputted from the second color decoder 71 is supplied to the other input side of the fifth switch 72. A fourth color difference signal (B-Y) outputted from the second color decoder 71 is supplied to the other input side of the sixth switch 73. A luminance signal outputted from the fourth switch 67 is supplied to one input side of a seventh switch 75 through a sixth line delay circuit 74. An output of the third adder 60 is connected with the other input side of this switch 75 through a seventh line delay circuit 76.

A motion detector (MD) 77, a logical OR circuit 78, a line delay circuit 79, and an eighth switch 80 are provided in order to control the first to seventh switches. The motion detector 77 is a circuit composed of low-pass filters and the like which detects motion of an image represented by the third color signal C12 and motion of an image represented by the fourth color signal C13 on the basis of the third and fourth color signals C12 and C13, and sets a first motion signal M1 at a high level (valid) in case that the third color signal C12 shows a motion and sets a second motion signal M2 at a high level (valid) in case that the fourth color signal C13 shows a motion. The motion detector 77 may contain a coring circuit. The first motion signal M1 is supplied to the logical OR circuit 78 and is also utilized to control switching of the first and second switches 62 and 63. The second motion signal M2 is supplied to the logical OR circuit 78 as well as being utilized to control switching of the third and fourth switches 65 and 67.

An output of the logical OR circuit 78 is supplied to the eighth switch 80 through the eighth line delay circuit 79 and is furthermore supplied to the fifth to seventh switches 72, 73, and 75 through the eighth switch 80. The eighth switch 80 is a switch for supplying a signal outputted from the eighth line delay circuit 79 to the fifth to seventh switches 72, 73, and 75 synchronously with a switching signal SWS. In a concrete example of controlling, to switch over the fifth to seventh switches 72, 73, and 75, the fifth to seventh switches 72, 73, and 75 select one input side in case that both of the motion signals M1 and M2 are at a low level (invalid) and in case that only the motion signal M1 is valid and scanning of a reference line (output of a luminance signal and a color difference signal) is performed. In addition the fifth to seventh switches 72, 73, and 75 select one input side also in case that the motion signal M2 is valid and scanning of an interpolating line (output of a luminance signal and a color difference signal) is performed.

In this case, the combination of the first delay circuit 52, the first subtracter 56, and the first adder 57 is referred to as the first separator part. The combination of the second adder 58 and the second subtracter 59 is referred to as the second separator part. The combination of the third adder 60 and the third subtracter 61 is referred to as the third separator part.

Figure 2:
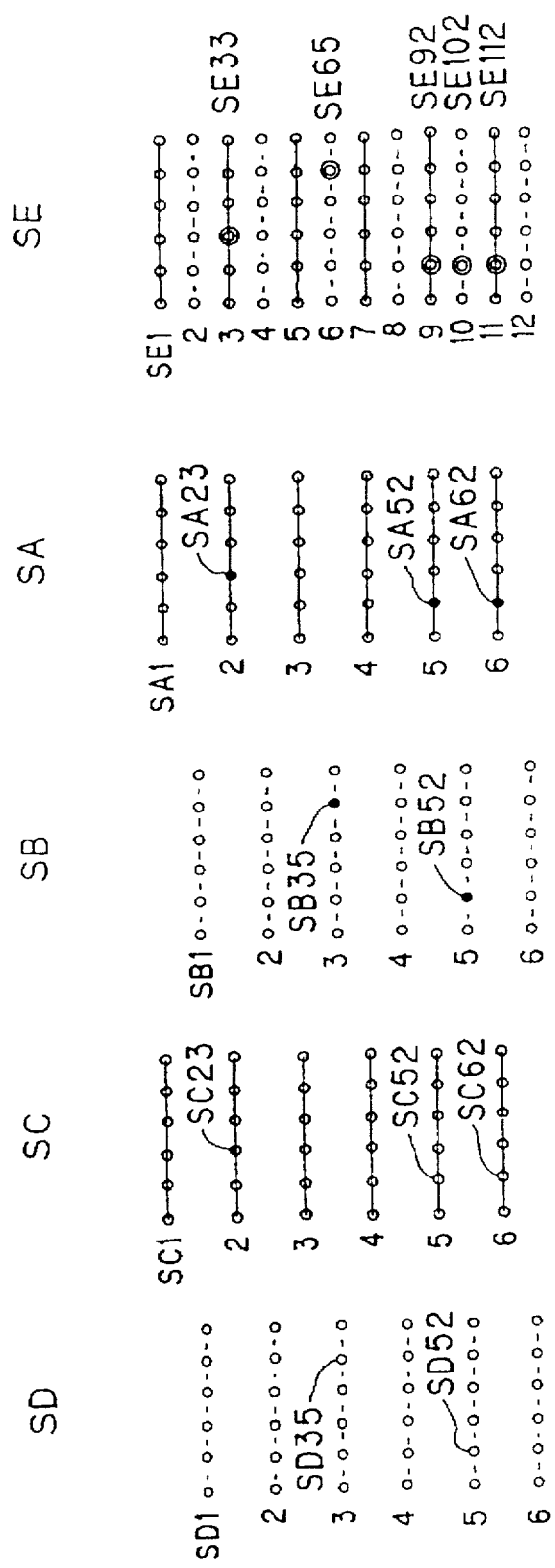
FIG. 2 is a figure for explaining operation of the converting apparatus for non-interlaced scanning of the invention.

Operation of a converting apparatus for non-interlaced scanning 51 of the present invention having the above-mentioned configuration is described with reference to FIG. 2. First, when an image signal IS (image signal SD) is received, this signal is written into the first field memory 53. Next, in case that a new image signal IS (image signal SC) is received, at the same time when this new image signal is written into the first field memory 53, the image signal SD is transferred from the first field memory 53 to the second field memory 54. And furthermore in case that a new image signal IS (image signal SB) is received, at the same time when this signal is written into the first field memory 53, the image signals SC and SD are transferred, respectively, from the first field memory 53 to the second field memory 54 and from the second field memory 54 to the third field memory 55. Still further, when a new image signal (image signal SA) is received, image signals for one frame of a non-interlaced scanning system are generated on the basis of these image signals SA to SD. An image signal SE is generated two lines by two lines like lines SE1 and SE2 or lines SE3 and SE4.

Now, it is assumed that pixels SA23, SA52, and SA62 of the image signal SA and pixels SB35 and SB52 of the image signal SB are pixels showing change (motion of an image). When the converting apparatus for non-interlaced scanning 51 generates lines SE1 and SE2 of an output signal (color difference signal and luminance signal) SE of a non-interlaced scanning system, a color signal C12 corresponding to the image signals SA and SC and a color signal C13 corresponding to the image signals SB and SD are analyzed in the motion detector 77. In this case, since no motion is detected in both of the color signals C12 and C13, both of the motion signals M1 and M2 outputted from the motion detector are set to be invalid (low level). As a result, the first to fourth switches 62, 63, 65, and 67 are switched over to the other input side. Furthermore the eighth switch 80 supplies output of the delay circuit 79 showing content of the motion detecting signals M1 and M2 to the fifth to seventh switches 72, 73, and 75 at the same time when the eighth switch 80 is switched synchronously with a switching signal SWS which is separately received. In this case, these switches 72, 73, and 75 are switched to one input side. In this case, a luminance signal and a color difference signal for the line SE1 are outputted from the fifth to seventh switches 72, 73, and 75 on the basis of the second luminance signal Y12 and the second color signal C12. Similarly, when the output related to the line SE1 has been completed, then the fifth to seventh switches 72, 73, and 75 are switched to the other input side. As a result, a luminance signal and a color difference signal for the line SE2 are outputted from these switches on the basis of the third luminance signal Y13 and the third color signal C13.

After this, when lines SE3 and SE4 are generated the motion detector 77 detects difference between a pixel SA23 of an image signal SA and a pixel SC23 of an image signal SC. In this case, when a luminance signal and a color difference signal related to these pixels are generated, the motion signal M1 outputted from the motion detector 77 is set to be valid. As a result, the first and second switches 62 and 63 are switched to one input side. As a result, a luminance signal and a color difference signal related to a pixel SE33 are generated on the basis of the first luminance signal Y11 and the first color signal C11.

Furthermore, when lines SE5 and SE6 are generated, the motion detector 77 detects difference between a pixel SB35 of an image signal SB and a pixel SD35 of an image signal SD. In this case, when a luminance signal and a color difference signal related to these pixels, the motion signal M2 outputted from the motion detector 77 is set to be valid. As a result, the third to seventh switches 65, 67, 72, 73, and 75 are switched to one input side. Accordingly, a luminance signal and a color difference signal related to a pixel SE65 are generated on the basis of the first luminance signal Y11 and the first color signal C11. After this, the switches are switched over in the same way, and pixels SE92, SE102, and SE112 are generated on the basis of the first luminance signal Y11 and the first color signal C11.

A converting apparatus for non-interlaced scanning of the present invention can obtain a luminance signal and a color difference signal of a non-interlaced scanning system on the basis of an image signal of an interlaced scanning system by performing a Y/C separation and a motion detection as using three field memories. That is to say, it can obtain a signal of a non-interlaced scanning system without being equipped with five field memories which have been indispensable to the prior art. As a result, the invention can make a converting apparatus for non-interlaced scanning more inexpensive in cost and smaller in size.

A preferred embodiment of the invention can be summarized as follows. It is an object of the invention to reduce the number of field memories for a converting apparatus for non-interlaced scanning. Three field memories 53 to 55, a Y/C separator and a motion detector are arranged on the converting apparatus. Based on a luminance signal and a color signal which are generated by the Y/C separator, three luminance signals and color differential signals are generated for a sample (base) line and a complemented line. The three luminance signals and color differential signals are selected based on a detected result of the motion detector. When the selection is carried out, the luminance signal and the color difference signal for a motion pixel are set to the luminance signal and the color difference signal which are generated based on the newest image signal.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The invention can be implemented by means of hardware comprising several distinct elements, and by means of a suitably programmed computer.

Figure 3:
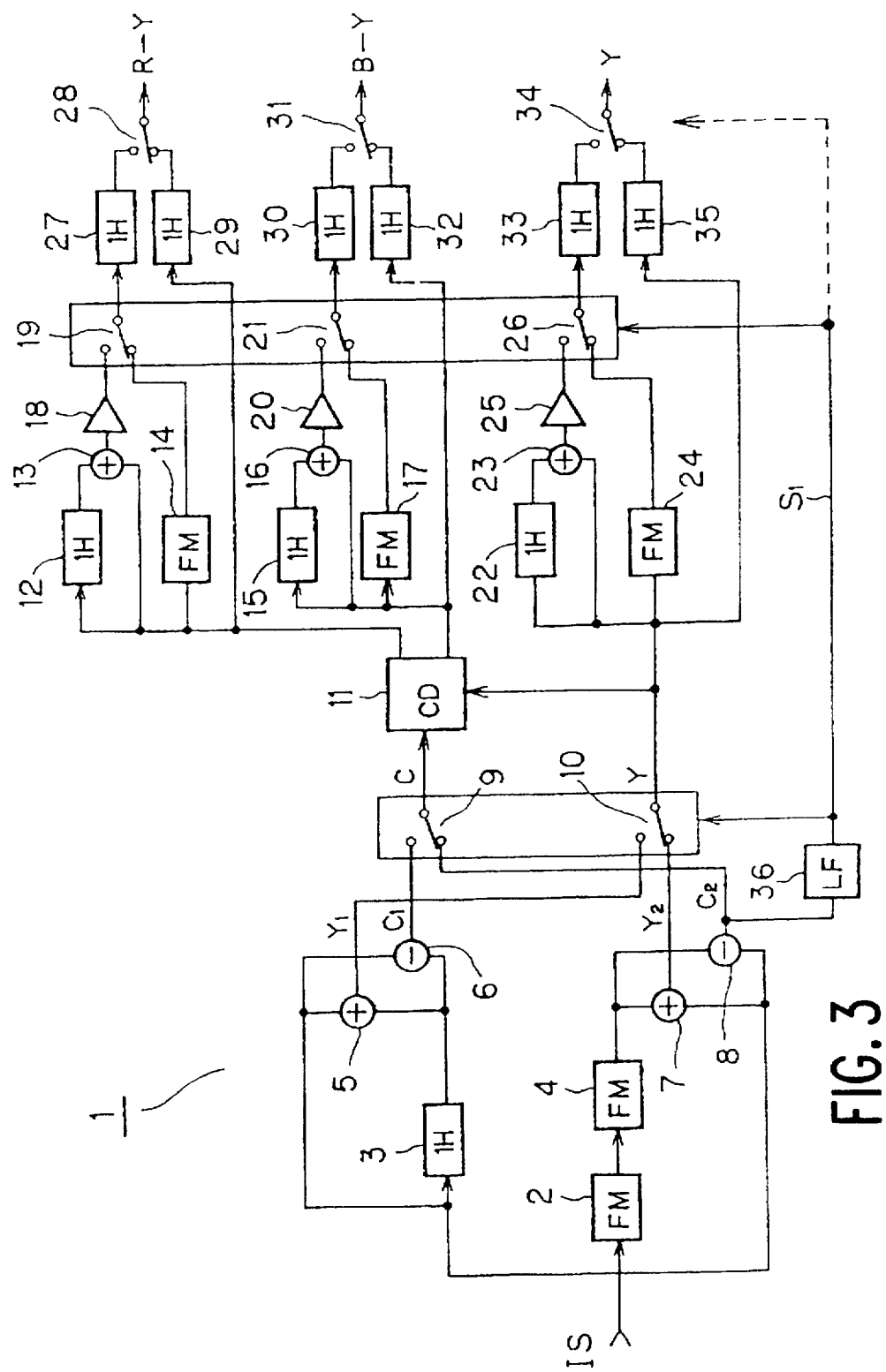
FIG. 3 is a block diagram of a converting apparatus for non-interlaced scanning of the prior art.

FIG. 3 shows a block diagram of a converting apparatus for non-interlaced scanning according to the prior art. In a scanning type converting apparatus 1 shown in the figure, an input image signal (composite signal) IS is supplied to a first field memory (FM) 2 and a first line delay circuit 3. A signal outputted from the first field memory 2 is supplied to a second field memory (FM) 4. The image signal IS and a first delayed signal delayed by a 1 line time (1H) in the first delay circuit 3 are added to each other in a first adder 5 and is subtracted in a first subtracter 6. A first luminance signal Y1 is outputted from the first adder 5 and a first color signal C1 is outputted from the first subtracter 6. The image signal IS and a second delayed signal outputted from the second field memory 4 are added to each other in a second adder 7 and are subtracted in a second subtracter 8. A second luminance signal Y2 is outputted from the second adder 7 and a second color signal C2 is outputted from the second subtracter 8.

The first and second color signals C1 and C2 are supplied to a first switch 9 and the first and second luminance signals Y1 and Y2 are supplied to a second switch 10. The first or second signal C1 or C2 selected by the first switch 9 is supplied to a color decoder (CD) 11. In the color decoder 11, a first color difference signal CS1 and a second color difference signal CS2 are generated. The first color signal CS1 is supplied to a second line delay circuit 12, a third adder 13, and a third field memory 14. The second color difference signal CS2 is supplied to a third line delay circuit 15, a fourth adder 16, and a fourth field memory 17. The first color difference signal CS1 and a second delayed signal delayed by 1H in the second delay circuit 12 are added to each other in the third adder 13. A signal outputted from the third adder 13 is supplied to a third switch 19 through a first attenuator circuit 18 which furnishes the average of the input and the output of the line delay circuit 12. The third switch 19 is supplied also with a color difference signal outputted from the field memory 14. The second color difference signal CS2 and a third delayed signal delayed by 1H in the third delay circuit 15 are added to each other in the fourth adder 16. A signal outputted from the fourth adder 16 is supplied to a fourth switch 21 through a second attenuator circuit 20. The fourth switch 21 is supplied also with a color difference signal outputted from the field memory 17.

A luminance signal Y outputted from the second switch 10 is supplied to the color decoder 11, a fourth line delay circuit 22, a fourth adder 23, and a fifth field memory 24. The luminance signal Y and a fourth delayed signal delayed by 1H in the fourth delay circuit 22 are added to each other in a fifth adder 23. A signal outputted from the fifth adder 23 is supplied to a fifth switch 26 through a third attenuator circuit 25. The fifth switch 26 is supplied also with a luminance signal outputted from the field memory 24.

A signal selected by the third switch 19 is supplied to a sixth switch 28 after being delayed by one line period (1H) in a fifth line delay circuit 27. This sixth switch 28 is supplied also with the first color difference signal CS1 delayed by 1H in a sixth line delay circuit 29. A signal selected by the fourth switch 21 is supplied to a seventh switch 31 after being delayed by 1H in a seventh line delay circuit 30. This seventh switch 31 is supplied also with the second color difference signal CS2 delayed by 1H in an eighth line delay circuit 32. A signal selected by the fifth switch 26 is supplied to a ninth switch 34 after being delayed by 1H in a ninth line delay circuit 33. The ninth switch 34 is supplied also with a luminance signal Y delayed by 1H in an tenth line delay circuit 35. The switches 9, 10, 19, 21, 26, 28, 31, and 34 are controlled to be switched by a switching signal S1 obtained by filtering the second color signal C2 by means of a filter 36 composed of a low-pass filter and the like.

In an existing scanning line converting apparatus 1 having the above-mentioned configuration, an interline Y/C separation of an image signal IS is performed by means of the first line delay circuit 3, the adder 5, and the attenuator 6. Similarly, an interframe Y/C separation of the image signal IS is performed by means of the field memories 2 and 4, the adder 7, and the subtracter 8. A filter 35 detects a pixel showing motion of an image on the basis of the second color signal C2 obtained by the interframe Y/C separation. In case that a result of detection has shown a motion, the filter 35 outputs, for example, a switching signal S1 of high level. When accepting the switching signal S1 of high level, the switches 9 and 10 are respectively switched to select the first color signal C1 and the first luminance signal Y1.

The color decoder 11 generates a first color difference signal (B-Y) CS1 and a second color difference signal (R-Y) CS2 on the basis of a color signal and a luminance signal outputted from the first switch 9 and the second switch 10. In case that a switching signal S1 is of high level, the first and second color difference signals are generated on the basis of a color signal C1 and a luminance signal Y1. The first color difference signal CS1 is applied to the second line delay circuit 12, the third adder 13, and the third field memory 14 in order to generate a color difference signal for an interpolating line. The third adder 13 performs addition of the first color difference signal CS1 and output of the third delay circuit. A result of this operation is applied to the third switch 19 through the first attenuator circuit 18. In case that the switching signal S1 is of high level, this switch 19 selects input from the attenuator circuit 18 side. Similarly, the second color difference signal CS2 is also applied to the third delay line circuit 15, the fourth adder 16, and the fourth field memory 17 in order to generate a color difference signal for an interpolating line. The fourth adder 20 performs addition of the second color difference signal CS2 and output of the fourth delay circuit. A result of this operation is applied to the fourth switch 21 through the second attenuator circuit 20. In case that the switching signal S1 is of high level, this switch 21 selects input from the attenuator circuit 20 side. Furthermore, a luminance signal Y is also applied to the fourth delay circuit 22, the fifth adder 23, and the fifth field memory 24 in order to generate a luminance signal for an interpolating line. The fifth adder 23 performs addition of the luminance signal Y and output of the fourth delay circuit 22. In case that the switching signal S1 is of high level, the fifth switch 26 selects input from the attenuator circuit 20 side.

An output of the third switch 19 and the first color difference signal CS1 are supplied to the sixth switch 28, respectively, through the fifth and sixth line delay circuits 27 and 29. The sixth switch 28 selects alternately an output of the fifth line delay circuit 27 and an output of the sixth line delay circuit 29 at specified intervals and outputs color difference signals (B-Y) for a sampled line and an interpolating line. Similarly, an output of the fourth switch 21 and the second color difference signal CS1 are supplied to the seventh switch 31, respectively, through the seventh and eighth line delay circuits 30 and 32. The seventh switch 31 selects alternately an output of the seventh line delay circuit 30 and an output of the eighth line delay circuit 32 at specified intervals and outputs color difference signals (RY). Furthermore, an output of the fifth switch 26 and a luminance signal Y are supplied to the eighth switch 34, respectively, through the ninth and tenth line delay circuits 33 and 35. The eighth switch 34 selects alternately an output of the ninth line delay circuit 33 and an output of the tenth line delay circuit 35 at specified intervals and outputs a luminance signal Y.

What is claimed is:

1. A converting apparatus for non-interlaced scanning by performing a Y/C separation of an image signal of interlaced scanning, and a motion detection of an image which is represented by said image signal for generating a color difference signal and a luminance signal of the non-interlaced scanning for said image signal, characterized in that the converting apparatus comprises:

a first Y/C separator for generating a first luminance signal and a first color signal based on a newest image signal;

a field memory having a capacity for storing image signals for three fields;

a second Y/C separator for generating a second luminance signal and a second color signal based on the newest image signal and the image signal stored in the field memory which generated two fields before said newest image signal;

a third Y/C separator for generating a third luminance signal and a third color signal based on the image signals stored in the field memory which were generated one field and two fields before the newest image signal, respectively;

a motion detector for detecting motion occurring in the image represented by the newest image signal and/or the image signals which are stored in the memory; and a scanning type converting part for generating the color difference signal and the luminance signal of the non-interlaced scanning by using the first to third color signals and the first to third luminance signals in accordance with a detected result of the motion detector.

2. A conversion method for non-interlaced scanning by performing a Y/C separation of an image signal of interlaced scanning and a motion detection of an image which is represented by said image signal for generating a color difference signal and a luminance signal of the non-interlaced scanning for said image signal, characterized in that the conversion method comprises the steps:

generating a first luminance signal and a first color signal based on a newest image signal;

storing image signals for three fields;

generating a second luminance signal and a second color signal based on the newest image signal and a stored image signal generated two fields before said newest image signal;

generating a third luminance signal and a third color signal based on stored image signals generated one field and two field before the newest image signal, respectively;

detecting motion occurring in the image represented by the newest image signal and/or the stored image signals; and generating the color difference signal and the luminance signal of the non-interlaced scanning by using the first to third color signals and the first to third luminance signals in accordance with a detected motion.

3. A converting apparatus for interlaced scanning by performing a Y/C separation of an image signal of an interlaced scanning system, and a motion detection of an image which is represented by said image signal for generating a color difference signal and a luminance signal of the interlaced scanning in accordance with the image signal, characterized in that the converting apparatus comprises:

a first Y/C separator for generating a first luminance signal and a first color signal based on a newest image signal;

a field memory having a memory capacity for storing image signals for three fields;

a second Y/C separator for generating a second luminance signal and a second color signal based on the newest image signal and the image signal stored in said field memory which is two fields prior to said newest image signal;

a third Y/C separator for generating a third luminance signal and a third color signal based on the newest image signal and the image signals which are stored in the field memory and are delayed one field and three fields, respectively;

a motion detector for setting a first detecting signal to a valid situation when motion occurs in the image represented by the second color signal, and for setting a second detecting signal to a valid situation when motion occurs in the image represented by the third color signal;

a first switch for selecting the first color signal when the first detecting signal is set to the valid situation, and for selecting the second color signal when the first detecting signal is set to an invalid situation;

a second switch for selecting the first luminance signal when the first detecting signal is set to the valid situation, and for selecting the second luminance signal when the first detecting signal is set to an invalid situation;

a third switch for selecting the first color signal when the second detecting signal is set to the valid situation, and for selecting an output of the first switch when the second detecting signal is set to the invalid situation;

a fourth switch for selecting the first luminance signal when the second detecting signal is set to the valid situation, and for selecting an output of the first switch when the second detecting signal is set to the invalid situation;

fifth and sixth switches for selecting the color difference signal which is generated by an output of the third switch when the color difference signal and the luminance signal based on the image signal of the odd field is output, and for outputting the color difference signal and the luminance signal based on the third color signal when the color signal and the luminance signal based on the image signal of the odd field and the second detecting signal is set to the invalid situation; and a seventh switch for selecting the luminance signal which is output from the fourth switch when the fifth and the sixth switches are selected the third switch and for selecting the third luminance signal when the fifth and sixth switch are selected to the third color signal.

* * * * *